United States Patent [19]
Kessler

[11] Patent Number: 5,402,584
[45] Date of Patent: Apr. 4, 1995

[54] UNIVERSAL TRANSFER GAUGE ASSEMBLY AND KIT

[76] Inventor: Dennis B. Kessler, 1084 Florida La., Elk Grove Village, Ill. 60007

[21] Appl. No.: 162,647

[22] Filed: Dec. 6, 1993

[51] Int. Cl.⁶ .............................................. G01B 5/14
[52] U.S. Cl. ........................................ 33/783; 33/795; 33/810; 33/501.4; 33/501.06
[58] Field of Search ................. 33/783, 784, 792, 794, 33/795, 796, 797, 806, 807, 810, 811, 812, 821, 823, 824, 501.06, 501.4, 501.6

[56] References Cited

U.S. PATENT DOCUMENTS

| | | |
|---|---|---|
| 264,339 | 9/1882 | Reece . |
| 443,869 | 12/1890 | Rigiander . |
| 541,916 | 7/1895 | Bowman ................ 33/823 |
| 695,661 | 3/1902 | Theibault . |
| 1,065,744 | 6/1913 | Sutorik . |
| 1,606,475 | 11/1926 | Kute . |
| 2,524,256 | 10/1950 | Greany ................ 33/501.4 |
| 2,726,626 | 12/1955 | Zelnick ................ 33/792 |
| 2,805,481 | 9/1957 | Locke, Sr. . |
| 2,916,829 | 12/1959 | Clay . |
| 3,054,189 | 9/1962 | Coulson ................ 33/794 |
| 3,104,470 | 9/1963 | Plante . |
| 3,104,477 | 9/1963 | Edwill . |
| 3,192,634 | 7/1965 | Johnson ................ 33/501.4 |
| 3,268,197 | 8/1966 | Mahr ................ 33/792 |
| 3,376,649 | 4/1968 | Finley . |
| 4,291,465 | 9/1981 | Hemeyer . |
| 4,939,848 | 7/1990 | Armstrong ................ 33/809 |
| 5,056,238 | 10/1991 | Chi ................ 33/810 |
| 5,074,054 | 12/1991 | Bower ................ 33/810 |

OTHER PUBLICATIONS

Brown and Sharpe Tool Manual P. 16,87 200 and 195 (1983 no month).
Dyer Catalogue 115 (no date).
Prior Art Drawing and Description (no date).

*Primary Examiner*—Christopher W. Fulton

[57] ABSTRACT

An assembly and kit adapted to receive an indicator for indicating a dimension of an object corresponding to a distance between two contact points having a moveable indicator pin defining one of the contact points, having: an elongated generally rectangular gauge body having a longitudinally extending recess; an adjustable device for fine adjustment of the depth and longitudinal position of the indicator pin extending at least partially through the recess of the gauge body; an anchor pin for extending downwardly from a gauge body defining the other contact point; and extension structure for course adjustment of the distance between the contact points a predetermined fixed amount, the anchor pin means being couplable to the gauge body or the extension structure.

18 Claims, 2 Drawing Sheets

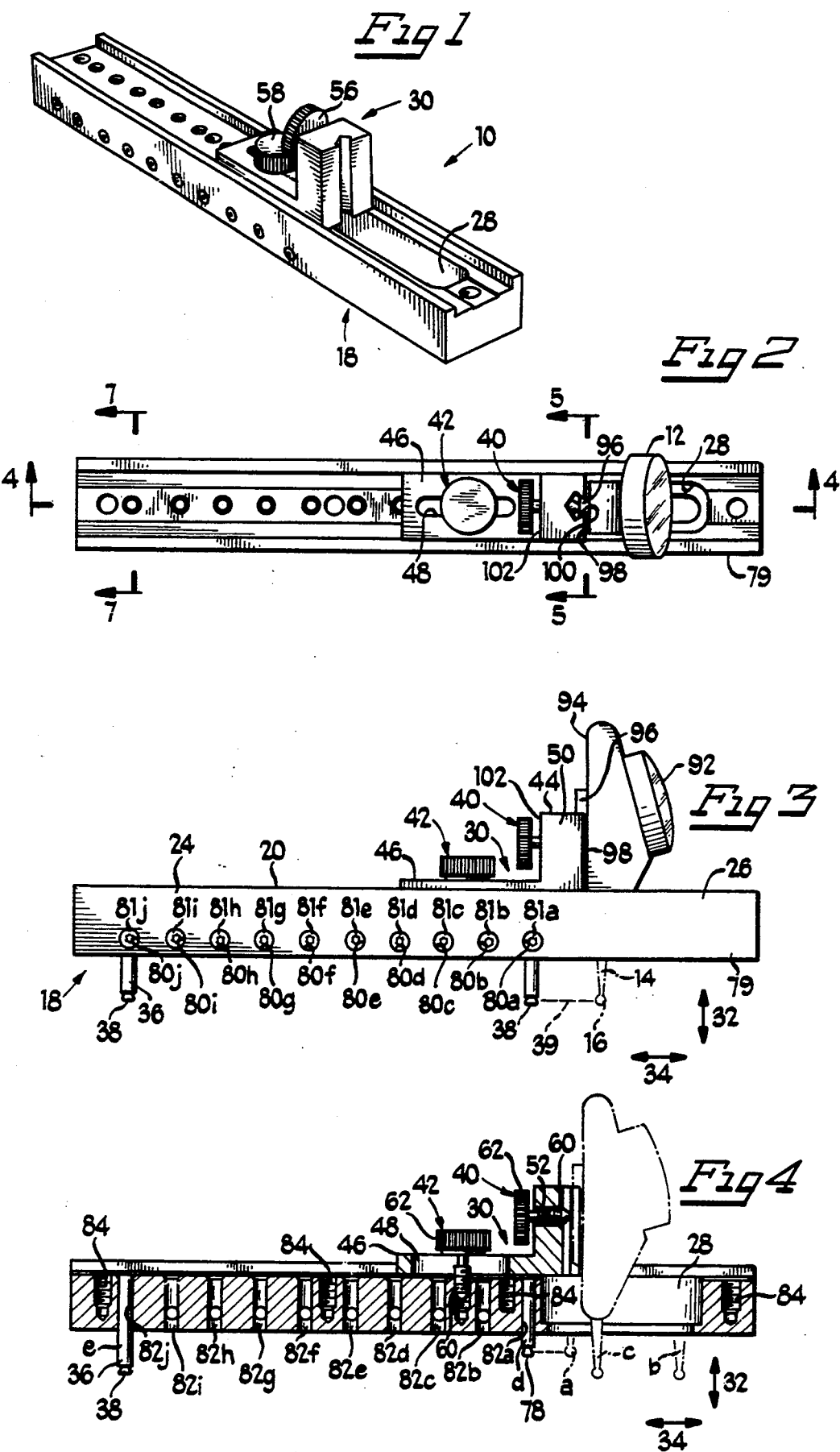

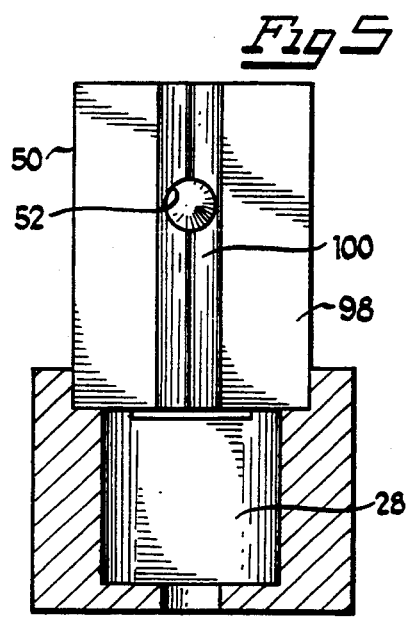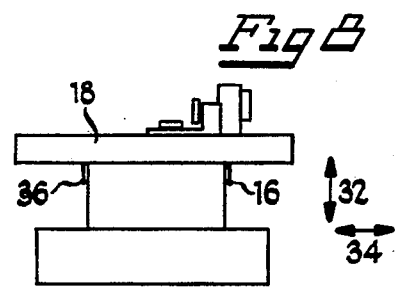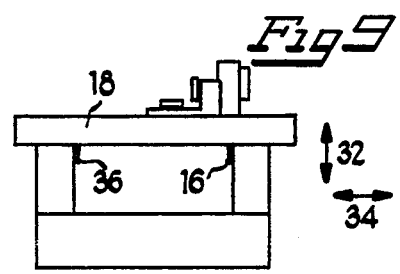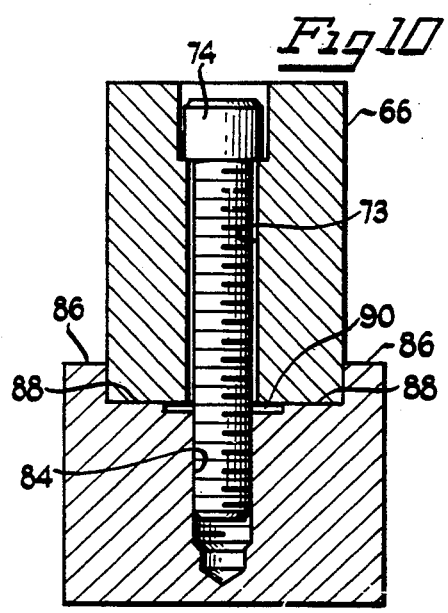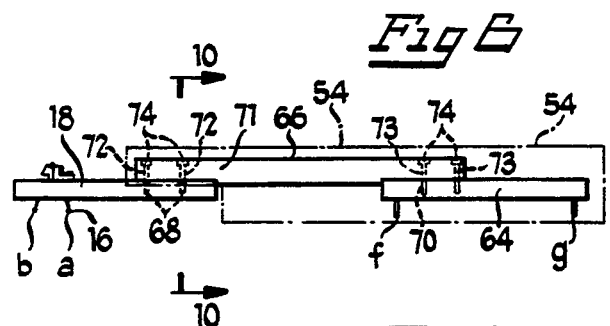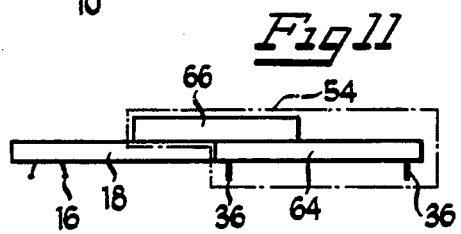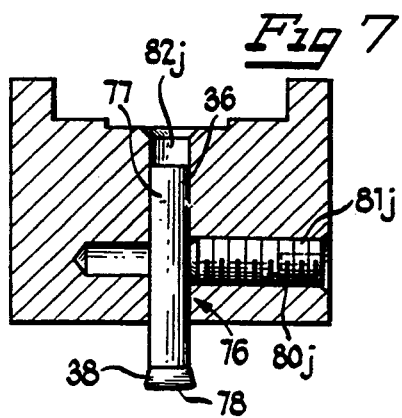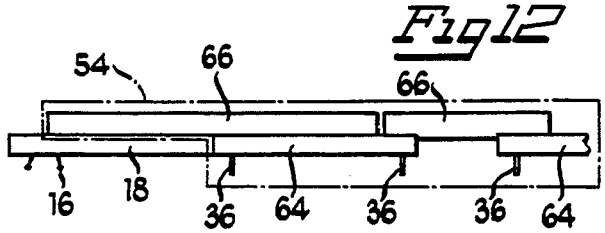

UNIVERSAL TRANSFER GAUGE ASSEMBLY AND KIT

FIELD OF THE INVENTION

The present invention relates to a machine shop tool for determining the deviation of dimensions between objects and, more particularly, the deviation in length between two points on a reference object and two points on a work piece.

BACKGROUND OF THE INVENTION

Heretofore various transfer gauges and associated components have been proposed. Several examples of these devices are disclosed in the following U.S. Patents and publications.

U.S. Pat. No. 264,339 discloses a gauge and beam-trammel.

U.S. Pat. No. 443,869 discloses a micrometer gauge.

U.S. Pat. No. 695,661 discloses a caliper gauge having an adjustable tube or barrel to allow adjustment of the length between the trammel points.

U.S. Pat. No. 1,065,744 discloses an alternate micrometer gauge.

U.S. Pat. No. 1,606,475 discloses a gauge particularly adapted for measuring dove tail grooves and slides with a dial or other type of indicator.

U.S. Pat. No. 2,524,256 discloses an opposed-contacts distance gauge.

U.S. Pat. No. 2,726,626 discloses a dial test indicator.

U.S. Pat. No. 2,805,481 discloses a tool gauge.

U.S. Pat. No. 2,916,829 discloses a measuring instrument.

U.S. Pat. No. 3,045,189 discloses an adapter for a dial indicator gauge.

U.S. Pat. No. 3,104,470 discloses a gauge with an adjustable pantograph preloading means.

U.S. Pat. No. 3,104,477 discloses an extendable level.

U.S. Pat. No. 3,268,197 discloses a clamping device for measuring instruments such as dial indicators. The clamping device comprises a post or stem in a dove-tail groove at one end for engagement with either of the slide bars for on the indicator case. The dove-tail groove and slide bar connector arrangement allows the adjustment of the indicator position along the slide bar axis.

U.S. Pat. No. 3,376,649 discloses another gauging apparatus.

U.S. Pat. No. 4,291,465 discloses a caliper rule device having an extended measurement range.

U.S. Pat. No. 4,939,848 discloses a vehicle frame alignment gauge including an elongated adjustable length beam.

U.S. Pat. No. 5,056,238 discloses a pair of vernier calipers having a protractor.

U.S. Pat. No. 5,074,054 discloses a gauge having an indicator dial with a lever or pin and a moveable stop adapted to be locked in one of a number of threaded holes in a base.

Selected excerpts from a Brown and Sharpe Tool Manual disclose verniers, micrometers and dial indicators on pages 16, 87 and 195, respectively, The Moderntools Corp. and the Dyer Catalogues diclose verniers, various dial indicators and gauges.

SUMMARY OF THE INVENTION

According to the present invention there is provided a universal transfer gauge assembly for measuring the distance between two points, comprising: an indicator device for indicating a dimension of an object corresponding to a distance between two contact points including a pivotable indicator pin means defining one of the contact points; an elongated gauge body including top and bottom portions and a distal section and a proximal section having a longitudinally extending recess; an adjustable device for adjusting the depth in a substantially vertical direction and longitudinal position in a substantially horizontal direction of the indicator device at least partially extending through the recess in the proximal section of the gauge body adjustably coupled to the indicator device and gauge body; an anchor pin extending from the bottom portion of the gauge body defining the second contact point; and an extension structure for extending the length a predetermined amount in a substantially horizontal direction coupled to the elongated body.

Also provided in the present invention is a universal transfer gauge assembly for measuring the distance between two points, comprising: an indicator device for indicating a dimension of an object corresponding to a distance between two points including a moveable indicator pin defining a first contact point; an elongated generally rectangular first gauge body including top and bottom and side portions each including at least partial planar surfaces and a distal section and a proximal section having a longitudinally extending recess adapted to receive the moveable indicator pin; an adjustable device for adjusting the depth in a substantially vertical direction and longitudinal position in a substantially horizontal direction of the indicator pin, extending at least partially through the recess in the proximal section of the gauge body adjustably coupled to the indicator and gauge body, the adjustable device being accessible from above the gauge body; an adjustable anchor pin extending outwardly from the bottom of the gauge body defining a second contact point, whereby the first and second contact points are adjustable and extend below the bottom portion of the gauge body; and an extension structure for extending the length a predetermined distance coupled to the first gauge body, including a second gauge body and a bridging device coupling the first and the second gauge bodies.

The present invention also provides a kit adapted to receive an indicator for indicating a dimension of an object corresponding to a distance between two contact points having a moveable indicator pin defining one of the contact points, having an elongated generally rectangular gauge body having a longitudinally extending recess; an adjustable device for fine adjustment of the depth and longitudinal position of the indicator pin extending at least partially through the recess of the gauge body; an anchor pin for extending downwardly from a gauge body defining the other contact point; and extension structure for course adjustment of the distance between the contact points a predetermined fixed amount, the anchor pin means being couplable to the gauge body or the extension structure.

BRIEF DESCRIPTION OF THE DRAWINGS

FIG. 1 is a partial perspective view of an embodiment of a universal transfer gauge assembly and kit of this invention adapted to receive an indicator device;

FIG. 2 is a partial top planar view of the universal transfer gauge assembly seen in FIG. 1, with an indicator device;

FIG. 3 is a side view of the universal transfer gauge assembly seen in FIG. 2;

FIG. 4 is a sectional view of the universal transfer gauge assembly seen in FIG. 2, taken along the lines 4—4 of FIG. 2.

FIG. 5 is a sectional view of the universal transfer gauge assembly seen in FIG. 2, taken along the lines 5—5 of FIG. 2;

FIGS. 6 and 11 are side views of the universal transfer gauge assembly seen in FIGS. 1-5 with an extension structure, showing a second gauge body and bridging device for course adjustment of predetermined fixed distances between the anchor pin and indicator pin;

FIG. 7 is a sectional view of the universal transfer gauge assembly seen in FIG. 2, taken along the lines 7—7 of FIG. 2;

FIGS. 8 and 9 are side views of the gauge body of the universal transfer gauge assembly, with work pieces to be measured;

FIG. 10 is a sectional view of the universal transfer gauge assembly seen in FIGS. 2 and 6, taken along the lines 10—10 of FIG. 6; and FIG. 12 is a side view of the universal transfer gauge assembly showing three gauge bodies and two bridging devices.

BRIEF DESCRIPTION OF THE INVENTION

As illustrated in FIGS. 1-12, a universal transfer gauge assembly 10 is shown, adapted for measuring a distance between two points.

In its simplest form, the transfer gauge assembly 10 is adapted to receive an indicator device 12 for indicating a dimension of an object corresponding to a distance between two contact points including a pivotable or moveable indicator pin 14, defining the first of the two contact points 16. The assembly 10 includes an elongated gauge body 18 including top and bottom portions 20 and 22 and a distal section 24 and proximal section 26 having a longitudinally extending horizontal recess 28. The assembly 10 further includes an adjustable device 30 for fine adjustment of the depth in a substantially vertical direction and for fine adjustment of the longitudinal position in a substantially horizontal direction (as shown by arrows 32 and 34 in FIGS. 3, 4, 8 and 9) of the indicator pin 14, respectively, which at least partially extends through the recess 28 in the proximal section 26 of the gauge body 18. The adjustable device 30 is adjustably coupled to the indicator device 12 and the elongated gauge body 18. An anchor pin 36 of the gauge assembly 10 extends substantially outwardly and downwardly from the bottom portion 22 of the gauge body 18, defining the second contact point 38. And finally, an elongated extension device 54 is coupled to the gauge body 18 for course horizontal adjustment of the assembly 10, preferably including a second gauge body 64 and bridging device 66 for improved integrity, stability, modularity, inter-connection and accurate readings of long distances between the contact points, as shown in FIGS. 6, 11 and 12. For accurate readings, the first and second contact points 16 and 38 are substantially aligned horizontally and include substantially identical distances from the bottom portion 22, as shown by the dashed line 39 in FIG. 3.

The adjustable device 30 includes a fine depth adjustment device 40 for adjusting the depth of the indicator pin 14 generally in a vertical direction below the bottom portion 22 of the gauge body 18. Advantageously, the depth adjustment knob 40 is accessible from above the gauge body 18 for facilitating adjustment by a machinist on the floor, for example. The adjustable device 30 further includes a fine horizontal or longitudinal position adjustment knob 42 for adjusting the indicator pin 14 horizontally along the recess 28. Also advantageously, the longitudinal position adjustment knob 42 is accessible from above the top portion 20 of the gauge body 18, for improved accessability and effective adjustment.

The adjustable device 30 further includes a generally L-shaped member 44 or structure rotated on its side about 90 degrees counter clockwise in FIG. 3. The L-shaped member 44 includes a first substantially horizontal member 46 having an elongated opening 48 in FIG. 4 and a second substantially vertical member 50 having one aperture 52. The aperture 52 is substantially perpendicular to the vertical member 50. The horizontal member 46 is adjustably-slideably couplable to the top portion 20 of the gauge body 18 with a knob 42, extending through the elongated opening 48, and threadably couplable to one of a plurality of threaded ports 84, for fastening and adjusting the indicator pin 14 longitudinally in a substantially horizontal direction 34. The vertical member 50 is adjustably couplable to the indicator device 12 with a depth adjusting knob 40 through the aperture 52, for adjusting the indicator pin 14 depth vertically, as shown by vertical arrow 32.

As shown in FIG. 3, the anchor pin 36 is couplable to and extends outwardly from the bottom portion 22 of the gauge body 18. Advantageously, the depth or distance of the anchor pin 36 below the bottom portion 22 of the gauge body 18 is adjustable, by varying the distance of the anchor pin 38 below portion 22 by adjustment of the fastener 81j in horizontal hole 80j.

In a preferred embodiment, the assembly 10 includes a kit including a plurality of anchor pins 38 of various lengths, for facilitating depth or distance adjustment thereof below the bottom portion 22. For example, the kit includes short and middle sized pins, as shown by items d and e in FIG. 4, respectively. In one kit embodiment, there are at least three anchor pins of varying length, two gauge bodies with the same or different lengths, and at least two or more bridging devices of different lengths for broad applications. Of course, under normal circumstances only one anchor pin is used at a time. The plurality of anchor and indicator pins in FIGS. 3, 4 6 11 and 12 are examples of various adjustable lengths between the contact points.

The anchor pin 36 is also longitudinally (or horizontally) adjustable along predetermined fixed distances along the bottom portion 22, by suitable connection and insertion of the anchor pin 36 in one of the plurality of vertical holes 82 on the bottom portion 22 of the gauge body 18, as detailed below.

Referring to FIG. 6, the extension device 54 is shown. Preferably, it includes a second gauge body 64 substantially identical to the first gauge body 18, and is coupled and aligned with the first body 64. The bridging device 66 is utilized for coupling the first gauge body 18 with the second gauge body 64 to increase the horizontal distance by predetermined fixed distances between the contact points 16 and 38. As should be understood by those skilled in the art, the structure of the extension device 54 can vary widely so long as there is a secure coupling so as to maintain the contact points 18 and 64 in substantially the same plane, for more accurate readings and similar distances below the bottom portions 22 of the gauge bodies 18 and 64.

In a preferred embodiment, the first and second gauge bodies 18 and 64 have at least two vertical holes 68 and 70, and the bridging device 66 also has vertical holes 72 and 74 at proximal and distal portions 71 and 71' for improved inter-connections. The holes 68 and 70 on first and second gauges 18 and 64 and holes 72 and threaded fastener 74 on the bridge 66, are adapted to be in registration with each other for simplified assembly, and efficient coupling and decoupling. Further, the holes 68, 70 and 72 are adapted to receive threaded fasteners 74, for securely coupling the first and second gauge bodies 18 and 64 with the bridging device 66. This structure provides for more accurate readings of long distances between the contact points.

Advantageously, the bridging device 66 allows the user to easily adjust the length or distance between the contact points 16 and 38. This structure allows large distances between the two contact points 16 and 38 to be accurately measured. In one embodiment, the assembly 10 can include a plurality of bridging devices 66 of various lengths and more than two gauge bodies, as shown in FIG. 12.

As best shown in FIG. 7, the anchor pin 36 includes an elongated body 76 including a proximal section 77 and an enlarged distal end 78 adapted to contact a single point of an object. The outer periphery of the distal end 78 is circular and defines the second contact point 38. As shown in FIG. 7, the proximal section 77 of the anchor pin 36 is adapted to be received in one of the plurality of vertical holes 82 on the bottom portion 22 of the gauge body Although some of the figures show more than one anchor pin, only one is normally use at one time. These figures are intended to illustrate the minimum and maximum spacings between the contact points, as shown for example, in FIG. 4 items d and e and FIG. 6 items a and b of pin 14 and items f and g of anchor pin 38.

As shown in FIG. 3, from the distal portion 24 on the right side 79 of the gauge body 18, are 10 equi-spaced horizontal threaded holes 80a–80j for coupling the anchor pin 36 to the gauge body 18. These holes terminate between the sides of the gauge body 18. As shown in FIG. 4, extending from the bottom portion 22 of the gauge body 18 to the top portion 20, is a plurality of equi-spaced vertical through-holes 82a–j adapted to receive the proximal section 77 and intermediate section of the anchor pin 36. The depth or distance of the second contact point 38 below the bottom portion 22, can be easily adjusted by varying the depth thereof and thereafter fastening a suitable fastener in the horizontal hole 80a–80j, such as an allen screw 81 in each of the horizontal holes 80, as shown in FIGS. 3 and 7.

As shown in FIG. 4, located on the top portion 20 of the elongated body 18 is a plurality of threaded vertical ports 84 extending downwardly for receiving fasteners for adjustably coupling the gauge body 18 to the second gauge body 64, with the bridging device 66. The threaded ports 84 in FIG. 4 are specially positioned and adapted to be in registration with the holes in the bridging device, for suitable assembly and disassembly, as illustrated in FIGS. 6, 11 and 12.

As shown in FIG. 10, the top portion 20 of the gauge body 18 includes planar vertical side guides 86, and substantially planar horizontal rails 88 for providing a smooth adjustment surface to allow the L-shaped member 44 to glide and travel thereon and thereover. Between the rails 88 is a groove 90. In a preferred embodiment, the bridging device 66 is complementarily configured to be partially received between the side guides 86, and is suitably positioned partially on the top portion 20 on the rails 88 and appropriately fastened thereto, for an improved and secure coupling.

Referring to FIG. 2, the indicator device 12 includes a suitable face 92 on one side and on the other side 94 includes an elongated flange 96. The flange 96 is adapted and complimentarily configured to be received in a vertical groove 100 on the vertical member 50. In one embodiment, the flange 96 and groove 100 define a vertical tongue and groove arrangement.

As should be understood by those skilled in the art, the indicator device can be mechanical or an electronic device depending on the application.

In one embodiment, the universal transfer gauge assembly 10 of the invention, includes: an indicator device 12 for indicating a dimension of an object corresponding to a distance between two points, including a moveable indicator pin 14, preferably a pivotable indicator pin device 14 defining a first contact point 16; an elongated generally rectangular gauge body 18 including top, bottom and side portions 20, 22 and 23, respectively, each including at least partial planar surfaces, and a distal section 24 and a proximal section 26 having a longitudinally (horizontally) extending recess 28 extending from the top to the bottom portions 20 and 22, adapted to receive the indicator pin 14; an adjustable device 30 for fine adjustment of the depth in a substantially vertical direction and for fine adjustment of the longitudinal position in a substantially horizontal direction of the indicator pin 14, extending at least partially through the recess 28 in the proximal section 26 of the gauge body 18, and adjustably coupled to the indicator device 12 and gauge body 18, and the adjustable device 30 is accessible from above the gauge body 18; an adjustable anchor pin 36 extending outwardly and downwardly from the recess 28 and the bottom portion 22 of the gauge body 18, a portion of which defines a second contact point 38, the first and second contact points 16 and 38 are adjustably located and positioned below the bottom portion 22 of the gauge body 18; And an extension structure 54 coupled to the gauge body 18 for extending the distance between the contact points 16 and 38. Preferably, the extension device 54 includes a second gauge body 64 and a bridging device 66.

The gauge assembly 10 of this invention provides an improved apparatus for measuring the distance between two points by facilitating the adjustment of the vertical and horizontal positions of the first and second contact points 16 and 38. More particularly, the gauge assembly 10 includes a fine adjustable device 30 for very fine and precise vertical (depth) and horizontal (longitudinal) adjustment of the first contact point 16 of the pin 14 as well as vertical (depth) and horizontal (longitudinal) adjustment of the second contact point 38 of the anchor pin 36, for improved accuracy while a machinist is on the floor, for example. In addition, the extension device 54 provides a way to extend the distances between the contact points a predetermined fixed length or stated another way, for course horizontal adjustment.

Thus, the gauge assembly 10 is particularly adapted to use by machinist, quality control personel and the like. The machinist simply stops the machining operation, and can make suitable measurements as required by the job. The fine adjustment of the contact point 16, can be made fast, easily and accurately by suitable positioning of adjustable device 30 and fine adjustment with knobs 40 and 42 of the depth and position of adjustment device 30. The positioning and accessibility of the knobs 40 and 42 above the gauge body 18 are particularly adapted to be user friendly, and to facilitate and simplify adjustment, without having to turn the gauge body 18 upside down to disadvantageously make adjustments, as required by certain prior art gauges. Course horizontal adjustment is accomplished with the predetermined lengths of the extension device. In a preferred embodiment, a plurality of gauge bodies, anchor pins and bridges are included to provide a number of options to the user.

In a preferred embodiment, the adjustable device 30 includes a depth (vertical) adjustment knob 40 and longitudinal (horizontal) position adjustment knob 42. The adjustable device 30 includes an L-shaped member rotated on its side, which includes a first substantially horizontal member 46 and a second vertical member 50. The vertical member 50 includes a proximal facing surface 98 having a vertical groove 100 running substantially vertically across the face 98, and a distal facing surface 102 having an aperture 52 running from the distal facing surface 102 to the vertical groove 100 on the proximal facing surface 98. The aperture 52 is adapted to receive an adjustable knob 42 therethrough. Advantageously, the horizontal member 46 has an elongated opening 48 adapted for receiving the knob 42 for adjustably coupling the horizontal member 46 to the top portion 20 of the gauge body 18, with knob 42.

The elongated opening 48 provides for very precise and fine adjustment of the first contact point 16 horizontally, as shown by arrow 34 in FIG. 4.

Advantageously, the knobs 40 and 42 are accessible from above the gauge body 18, for facilitating fine adjustment of the depth and horizontal position of the indicator pin 14. In a preferred embodiment, the flange 96 is adapted for and complimentarily configured to be slidably received in the vertical groove 100, for facilitating the depth adjustment of the contact point 16 of the indicator pin 14.

In a preferred embodiment, a kit of many of the components and structure of the universal transfer gauge assembly 10, as described in detail above is included.

The kit can comprise the previously described components. In its simplest form, the kit includes at least the gauge 18 and the extension device 54. Preferably, the kit is modular for ease of assembly and disassembly. More particularly, the kit includes at least two gauges 18 and 64, at least two anchor pins 36 of differing lengths and at least one or more bridging devices 66, as previously described herein.

In a preferred embodiment, the kit includes at least three different sized anchor pins 36, at least two gauge bodies and at least two bridging devices 66 of differing lengths. The kit could also preferably include a container for holding the components of the kit and minimizing the possablity of breakage and scratching thereof, for example by including receptacles for receiving the components. The kit can also include an indicator device 18 adapted to be coupled to one or more of the gauge bodies.

Although the present invention has been described with reference to preferred embodiments, numerous modifications and variations can be made by those skilled in the art without departing from the novel spirit and scope of this invention. No limitation with respect to the specific embodiments disclosed herein is intended or should be inferred.

That which is claimed is:

1. A universal transfer gauge assembly for measuring the distance between two points, comprising:
    (a) indicator means for indicating a dimension of an object corresponding to a distance between two contact points including a moveable indicator pin means defining one of the contact points;
    (b) elongated first and second gauge bodies including top and bottom portions and a distal section and a proximal section having a longitudinally extending recess and a plurality of downwardly facing holes adapted to receive an anchor pin;
    (c) adjustable means for adjusting the depth in a substantially vertical direction and longitudinal position in a substantially horizontal direction of the indicator pin at least partially extending through the recess in the proximal section of the first gauge body adjustably coupled to the indicator means and first gauge body;
    (d) an anchor pin extending from the bottom portion of the second gauge body defining the second contact point; and
    (e) a bridging device for course adjustment of the distance between the contact points in a substantially horizontal direction coupled to the first and second gauge bodies, the bridging device being substantially complementarily configured with respect to the top portions of the first and second gauge bodies, and the gauge bodies and the bridging device having registration holes adapted to receive fasteners for secure coupling and simplified decoupling of the gauge bodies and bridging device.

2. The transfer gauge assembly of claim 1, wherein said bridging device has at least four registration holes.

3. The transfer gauge assembly of claim 2, wherein said extension means includes a bridging device coupling the first gauge body with the second gauge body, the first and the second gauge bodies and the bridging device having holes in registration adapted to receive fasteners coupling the gauge bodies and the bridging device.

4. The transfer gauge assembly of claim 3, wherein said bridging device is configured to be received on and coupled to the first and the second gauge bodies.

5. The transfer gauge assembly of claim 1, wherein the first and second gauge bodies have at least two registration holes in the proximal section and two in the distal section, in substantial registration with the registration holes of the bridging device.

6. The transfer gauge assembly of claim 1, wherein said anchor pin means is couplable to and extends outwardly from the bottom portion of the second gauge body, the depth of the anchor pin means below the bottom portion of the second gauge body and the longitudinal position thereof is horizontally adjustable along the bottom portion of the second gauge body.

7. The transfer gauge assembly of claim 1, wherein the anchor pin includes an elongated body having an enlarged distal end adapted to contact a point of an object.

8. A universal transfer gauge assembly for measuring the distance between two points, comprising;
    (a) indicator means for indicating a dimension of an object corresponding to a distance between two points including a moveable indicator pin means defining a first contact point;
    (b) an elongated generally rectangular first gauge body including a top having a groove section, bottom and side portions each including at least partial planar surfaces and a distal section and a proximal section having a longitudinally extending recess adapted to receive the moveable indicator pin meads;

(c) adjustable means for adjusting the depth in a substantially vertical direction and longitudinal position in a substantially horizontal direction of the indicator pin means, extending at least partially through the recess in the proximal section of the gauge body adjustably coupled to the indicator means and gauge body, said adjustable means being accessible from above the gauge body;

(d) an adjustable anchor pin extending outwardly from a bottom of a second gauge body defining a second contact point, whereby the first and second contact points are adjustable and extend below the bottom portions of the first and second gauge bodies, the first and second gauge bodies having substantially similar constructions; and (e) extension means for extending the length between the contact points a predetermined amount coupled to the first and the second gauge bodies, including the second gauge body and a bridging device coupling the first and the second gauge bodies, the groove sections of the gauge bodies being substantially complementarily configured to receive the bridging device, the gauge bodies and the bridging device having registration holes for coupling and decoupling the gauge bodies with the bridging device.

9. The universal transfer gauge assembly of claim 8, wherein said first and said gauge bodies have substantially the same geometry.

10. The universal transfer gauge assembly of claim 9, wherein said bridging device is configured to be received on and coupled to the first and the second gauge bodies.

11. The universal transfer gauge assembly of claim 9, wherein said substantially L-shaped member includes a second substantially vertical member including a proximal facing surface having a vertical groove and a distal facing surface having at least one port running from the distal facing surface to the vertical groove on the proximal facing surface, adapted for receiving a fastener therethrough.

12. The universal transfer gauge assembly of claim 11, wherein the indicator means includes a face on one side and an elongated flange on the other, the flange is adapted and complimentarily configured to be slidably received in the groove on the proximal facing surface of the substantially L-shaped member.

13. The universal transfer gauge assembly of claim 10, wherein said fastener includes an elongated threaded section and a circular knurled head.

14. The universal transfer gauge assembly of claim 8, wherein the indicator is an electronic device.

15. The universal transfer gauge assembly of claim 8, wherein the bridging device, the first gauge body and the second gauge body each have holes in registration with each other adapted for receiving fasteners therein.

16. A kit adapted to receive an indicator for indicating a dimension of an object corresponding to a distance between two contact points having a moveable indicator pin defining one of the contact points, comprising;

elongated generally rectangular first and second gauge bodies having a longitudinally extending recess and a plurality of registration holes adapted to receive fasteners;

adjustable means for fine adjustment of the depth and longitudinal position of the indicator pin extending at least partially through the recess of the first gauge body, said adjustable means being moveable in a substantially horizontal direction and couplable along the top portion of the gauge body;

anchor pin means for extending downwardly from the second gauge body defining the other contact point; and extension means for course adjustment of the distance between the contact points a predetermined fixed amount: comprising the second gauge body and a bridging device for connecting the first and the second gauge the extension means being couplable to the first and the second gauge bodies, the first and second gauge bodies include a top surface with a channel constructed to receive a substantially complementarily configured bridging device, and the first and the second gauge bodies and the bridging device have registration holes for coupling file gauge bodies with the bridging device.

17. The kit of claim 16, further comprising a plurality of anchor pins, gauge bodies and bridging devices, having the same or different lengths.

18. The kit of claim 16, wherein the first and the second gauge bodies are substantially structurally similar.

* * * * *